(12) United States Patent
Chisha et al.

(10) Patent No.: US 7,950,252 B2
(45) Date of Patent: May 31, 2011

(54) METHOD OF MANUFACTURING FORMED ARTICLE, SUPPORT MEMBER, AND FORMING APPARATUS

(75) Inventors: Mikio Chisha, Shinjuku-ku (JP); Masaaki Matsushima, Shinjuku-ku (JP); Noriaki Taguchi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 25 days.

(21) Appl. No.: 12/095,648

(22) PCT Filed: Nov. 20, 2006

(86) PCT No.: PCT/JP2006/323135
§ 371 (c)(1),
(2), (4) Date: Feb. 10, 2009

(87) PCT Pub. No.: WO2007/063734
PCT Pub. Date: Jun. 7, 2007

(65) Prior Publication Data
US 2009/0295033 A1 Dec. 3, 2009

(30) Foreign Application Priority Data
Nov. 30, 2005 (JP) .................................. 2005-345459

(51) Int. Cl.
*B29C 51/00* (2006.01)
(52) U.S. Cl. ................. 65/107; 65/104; 65/106; 65/102; 65/103
(58) Field of Classification Search ............ 65/286–291, 65/102–107, 90–94, 273, 24
See application file for complete search history.

(56) References Cited

U.S. PATENT DOCUMENTS
3,607,186 A 9/1971 Bognar
(Continued)

FOREIGN PATENT DOCUMENTS
JP 55007507 A * 1/1980
(Continued)

OTHER PUBLICATIONS
Derwentt abstract of JP 55007507.*
(Continued)

*Primary Examiner* — Christina Johnson
*Assistant Examiner* — Xue Liu
(74) *Attorney, Agent, or Firm* — Sughrue Mion, PLLC

(57) ABSTRACT

The present invention relates to a method of manufacturing a formed article comprising forming an upper surface of a forming material comprised of a thermosoftening substance into a desired shape by positioning the forming material on a forming surface of a mold and heating the forming material to a temperature permitting deformation to bring an entire surface of a lower surface of the forming material into tight contact with the forming surface. The positioning of the forming material is conducted by supporting the forming material with a support member so that at least a portion of a lower surface rim portion of the forming material is in tight contact with the forming surface and a center portion of the lower surface of the forming material is separated from the forming surface, and the support with the support member is conducted so that a lower portion of a lateral surface of the forming material is separated from the support member and at least a portion of an upper edge portion of the lateral surface of the forming material is supported by the support member. According to the present invention, a formed article with a desired shape can be manufactured with high precision by hot sag forming method.

9 Claims, 3 Drawing Sheets (a)

(b)

U.S. PATENT DOCUMENTS 4,105,429 A * 8/1978 Delgado .................. 65/107
4,119,424 A * 10/1978 Comperatore ............ 65/107
4,589,901 A    5/1986 Yoshizawa et al.

FOREIGN PATENT DOCUMENTS

| | | |
|---|---|---|
| JP | 4-275930 A | 10/1992 |
| JP | 9-124339 A | 5/1997 |
| JP | 10-25123 A | 1/1998 |
| RU | 2 087 430 C1 | 8/1997 |
| SU | 1426954 A2 | 9/1988 |
| WO | 95-23769 A1 | 9/1995 |
| WO | 2005-108317 A1 | 11/2005 |

OTHER PUBLICATIONS

Derwent abstract of JP55007507, 1980.*
International Search Report for corresponding PCT application, 2007.
Official Decision on Grant dated Oct. 26, 2010, corresponding to Russian Application No. 2008126286.

* cited by examiner (a)

(b)

(a)

(b)

METHOD OF MANUFACTURING FORMED ARTICLE, SUPPORT MEMBER, AND FORMING APPARATUS

CROSS REFERENCE TO RELATED APPLICATIONS

This application is a National Stage of International Application No. PCT/JP2006/323135 filed on Nov. 20, 2006, claiming priority based on Japanese Patent Application No. 2005-345459, filed on Nov. 30, 2005, the contents of all of which are incorporated herein by reference in their entirety.

TECHNICAL FIELD

The present invention relates to a method of manufacturing a formed article by hot sag forming method, and a support member and a forming apparatus that can be used in the method.

TECHNICAL BACKGROUND

Methods of forming glass molds for eyeglass lenses include employing mechanical grinding and polishing methods, mechanical grinding methods, and electrical processing methods such as electrical discharge processing to produce a heat-resistant base mold, bringing this base mold into contact with a glass blank softened by heating to transfer the surface shape of the base mold, employing a grinding program for each surface shape to be obtained, and forming a base mold having a corresponding surface shape.

In recent years, the demand has increased for multifocal eyeglass lenses being made thinner and lighter by incorporation of axially symmetric, aspherical lens design. The hot sag molding method has been proposed (see Japanese Unexamined Patent Publication (KOKAI) Heisei Nos. 6-130333 and 4-275930) as a method for forming molds to produce eyeglass lenses having such complex shapes.

DISCLOSURE OF THE INVENTION

In the hot sag forming method, a forming material comprised of a thermosoftening substance such as glass is placed on a mold, and softened by being heated to a temperature greater than or equal to its softening point, causing it to tightly contact with the mold. The shape of the mold is thus transferred to the upper surface of the forming material, yielding a formed article of desired surface shape.

In the hot sag forming method, since the surface shape of the mold forming surface is transferred to the upper surface of the forming material, it is desirable to precisely control the position on which the forming material is put to obtain high surface precision.

Thus, for example, it is conceivable that positioning is conducted by supporting the forming material on the mold with a ring-shaped support member. However, when the forming material of glass or the like in contact with the support member is heated and softened, pressure and deformation occur at a contact portion due to the difference of thermal expansion coefficient between the support member and the forming material, resulting in deterioration of the forming precision. In addition, there is a problem in that fusion occurs between the forming material and the support member when the forming material in contact with the support member is heated and softened.

Thus, it is also conceivable to remove the support member after positioning in order to prevent the above fusion. However, it is difficult to remove the support member from the forming material without changing the position of the forming material positioned on the mold at all. In addition, there is a risk of displacement of the forming material due to delivery and the like unless the forming material is supported until the heat-softening proceeds to some extent.

Under such circumstances, it is an object of the present invention to manufacture a formed article with high forming precision in a hot sag forming method by positioning the forming material on the mold precisely and preventing displacement during heat-softening.

The present invention relates to:

a method of manufacturing a formed article comprising forming an upper surface of a forming material comprised of a thermosoftening substance into a desired shape by positioning the forming material on a forming surface of a mold and heating the forming material to a temperature permitting deformation to bring an entire surface of a lower surface of the forming material into tight contact with the forming surface, wherein the positioning of the forming material is conducted by supporting the forming material with a support member so that at least a portion of a lower surface rim portion of the forming material is in tight contact with the forming surface and a center portion of the lower surface of the forming material is separated from the forming surface, and the support with the support member is conducted so that at least a portion of an upper edge portion of the lateral surface of the forming material is supported by the support member in a state where a lower portion of a lateral surface of the forming material is separated from the support member.

The present invention further relates to:

a support member for use in a forming method forming an upper surface of a forming material comprised of a thermosoftening substance that has been positioned on a forming surface of a mold into a desired shape by heating the forming material to a temperature permitting deformation to bring a lower surface of the forming material into tight contact with the forming surface, the support member being used for supporting the forming material positioned on the forming surface, which has:

an annular part, and on an inner circumference of the annular part, a support area contacting with at least a portion of the upper edge portion of the lateral surface of the forming material positioned on the forming surface prior to the heating and a nonsupport area being in noncontact state with the forming material.

The present invention further relates to:

a forming apparatus for use in a method of manufacturing a formed article comprising forming an upper surface of a forming material comprised of a thermosoftening substance into a desired shape by positioning the forming material on a forming surface of a mold and heating the forming material to a temperature permitting deformation to bring an entire surface of a lower surface of the forming material into tight contact with the forming surface, comprising:

a mold having a forming surface and the above support member, wherein the forming surface comprises a rim tight contact part and a center separate part, prior to the heating, the rim tight contact part being in tight contact with at least a portion of a rim portion of the lower surface of the forming material and the center separate part separating from a center portion of the lower surface of the forming material.

The present invention permits the manufacturing of formed articles of desired shape with high precision by hot sag forming method.

BEST MODE FOR CARRYING OUT THE INVENTION

The present invention will be described in greater detail below.

The present invention relates to a method of manufacturing a formed article forming an upper surface of a forming material comprised of a thermosoftening substance into a desired shape by positioning the forming material on a forming surface of a mold and heating the forming material to a temperature permitting deformation to bring an entire surface of a lower surface of the forming material into tight contact with the forming surface. The above positioning of the forming material is conducted by supporting the forming material with a support member so that at least a portion of a lower surface rim portion of the forming material is in tight contact with the forming surface and a center portion of the lower surface of the forming material is separated from the forming surface, and the above support with the support member is conducted so that at least a portion of an upper edge portion of the lateral surface of the forming material is supported by the support member in a state where a lower portion of a lateral surface of the forming material is separated from the support member. In the present invention, by positioning the forming material and providing support by means of the support member in this manner, the forming material on the forming surface can be positioned and supported without fusion between the forming material and the support member. This will be described below based on FIGS. 1 and 2.

FIG. 1 is a schematic diagram of the state of contact between the mold and the forming material before and after softening. In the form shown in FIG. 1, a meniscus-shaped forming material with a convex lower surface and a concave upper surface is positioned on the forming surface of a convex mold. FIG. 2 is an enlarged schematic diagram of the state of contact between the support member and the lateral surface of the forming material before and after softening.

In the present invention, at the start of forming, a forming material is positioned on the forming surface of the mold in a state supported by the support member. As shown in FIG. 2(a), the support provided by the support member is provided with the lower portion of the lateral surface of the forming material being separated from the support member, and at least a portion of the upper edge portion of the lateral surface of the forming material being supported by the support member. In this context, for example, the upper edge portion of the lateral surface of the forming material refers to the upper $4/5$, preferably the upper $1/2$, of the lateral surface of the forming material, and the lower portion of the lateral surface of the forming material refers to the portion positioned lower than the portion that is supported by the support member in the manner set forth above.

Further, at the start of forming, as shown in FIG. 1(a), the forming material is positioned on the forming surface of the mold so that a lower surface rim portion of the forming material is in tight contact with the forming surface and a center portion of the lower surface of the forming material is separated from the forming surface. In this context, the lower surface center portion of the forming material refers to a position from the center of the lower surface to about $1/2$ the radius, preferably a position from the center of the lower surface to a radius of 50 mm. The lower surface rim portion of the forming material that is in tight contact with the forming surface is a portion that is positioned away from the lower surface center portion of the forming material. At the start of forming, only the lower surface rim portion of the forming material is in contact with the forming surface of the mold. The lower surface of the forming material positioned and the forming surface are separated over the entire area inside the rim portion moving toward the geometric center of the forming material to form a space.

When the forming material is heat-softened with just the lower surface rim portion in contact with the forming surface of the mold in this manner, the center portion of the softening forming material deforms vertically under its own weight as it is heated. As shown in FIG. 1(b), the center portion of the lower surface comes into contact with the forming surface. This change in shape of the lower surface causes the upper surface of the forming material to undergo minute contraction and change shape. In the present invention, since the forming material is supported by the support member only at the upper edge portion of the lateral surface, this contraction of the upper surface of the forming material eliminates the contact between the forming material and the support member. As shown in FIG. 2(b), the support member then separates from the forming material. Additionally, since the rim portion of the forming material has been in a state of contact with the forming surface since the start of forming, inhibiting enlargement due to thermal expansion, a state of non-contact can be maintained between the lower portion of the lateral surface of the forming material and the support member. In this manner, at least when the entire surface of the lower surface of the forming material is in tight contact with the forming surface of the mold, the forming material can be in a state of separation from the support member. Thus, in the present invention, highly precise forming becomes possible by positioning the forming material on the mold without fusion of the glass material with the support member to prevent displacement during heat-softening. Further, since the lower portion of the lateral surface of the forming material does not come into contact with the support member during forming, the generation of distortion and the like by pressure due to differences in thermal expansion can be prevented.

In the present invention, since contact between the forming material and the support member is eliminated as the forming material changes shape (displacement of the center portion of the lower surface of the forming material in the direction of contact with the forming surface, and the accompanying contraction of the upper surface of the forming material) due to heat-softening, there is no need to remove the support member to prevent fusion. Thus, forming can be conducted without removing the support member from the mold and without causing fusion of the forming material and the support member. In the present invention, it is desirable to maintain the support member in a secure state on the mold, at least until the upper edge portion of the lateral surface of the forming material separates from the support member, and further, until completion of forming of the upper surface of the forming material. This permits exact positioning and enhances forming precision.

The support member and the support provided by the support member will be described below in detail.

As stated above, the support member employed in the present invention has a shape permitting the support of at least a portion of the upper edge portion of the lateral surface of the forming material while maintaining a state of non-contact with the lower portion of the lateral surface of the forming material. An example of such a support member is an annular member that is circular in shape along the edge surface of the circumference of the forming material, with space in the portion over which the forming material is positioned, as shown by the cross-sectional view provided in FIG. 1. The top view of the annular member shown in FIG. 1 is shown in FIG. 3(a) and the cross-sectional view along section line I-I in FIG. 3(a) is shown in FIG. 3(b).

It suffices for the above support member to support at least a portion of an upper edge portion of the lateral surface of the forming material. However, to stably support the forming material, it is desirable for the forming material to be supported through contact with at least three points on the upper edge portion of the lateral surface of the forming material, and it is preferable for the forming material to be supported through contact with the entire circumference of the upper edge portion of the lateral surface of the forming material. For example, the annular member shown in FIG. 1, as shown in FIG. 2, has a protruding part 1101 and an edge surface 1102 on the inner circumference. Protruding part 1101 contacts the upper edge portion of the lateral surface of the forming material to support the forming material. Edge surface 1102 faces, but does not contact, the lateral surface of the forming material. The protruding part does not necessarily have to run around the entire inner circumference of the support member, but may be provided partially. For example, three or more protruding parts may be arranged on the inner circumference of the support member, preferably at equal angles. However, it is desirable for the protruding part to be in the form of a ring running completely around the inner circumference of the support member so as to provide reliable positioning and support.

The shape of protruding part 1101 can be determined in consideration of the shape and dimensions of the forming material being positioned and supported. For example, when protruding part 1101 is formed completely around the inner circumference of the support member and the forming material 60 to 90 mm in outer diameter is employed, the inner diameter of protruding part 1101 can be set within a tolerance range of −0 to +0.05 mm in the external shape of the forming material, based on the outer diameter of a forming material. The width (d in FIG. 2) of the contact portion of protruding part 1101 with the upper edge portion of the lateral surface of the forming material is desirably adequate to support the forming material and separate after softening. For example, when the width (D in FIG. 2) of the lateral surface of the forming material is 3 to 20 mm, it is desirable about 10 to 20 percent of D. The upper rim portion of protruding part 1101 is desirably positioned so as to contact the upper rim edge portion of the forming material.

As shown in FIGS. 1 and 2, the support member can be positioned by fitting into the top of the rim of the mold. The shape of the edge surface 1105 fitting into the mold is desirably set to match the shape of the mold. For example, when employing a forming material with the above-stated outer diameter, a tolerance of +0.1 to 0.2 mm can be set based on the outer diameter of the mold. Further, a step mount portion can be provided on the lateral surface of the mold and fitted into the bottom surface of the circumference of the support member to more stably support the support member.

In the present invention, as shown in FIG. 1, a duct protective lid can be positioned over the mold on which the forming material has been positioned to prevent contamination by foreign matter such as dust and debris during the forming. When employing the duct protective lid, edge surface 1103 in the step portion of the circumference of the forming material and the opening of the dust protective lid are fitted together to position the dust protective lid, for example as shown in FIG. 2. The width of edge surface 1103 may have an adequate area relative to the opening of the dust protective lid; for example, about 6 to 8 mm may be employed. The surface of edge surface 1103 can be mirror processed to enhance the tightness of the fit into the dust protective lid.

The above support member supports at least a portion of the upper edge portion of the lateral surface of the forming material positioned by protruding part 1101 provided on the inner circumference part, preferably supports the entire circumference of the upper edge portion of the lateral surface of the forming material, and positions the forming material at a desired location on the forming surface of the mold. For example, this desired location may be a position in which the geometric center of the forming surface of the mold conforms to the optical center or geometric center of the forming material.

The above support member is desirably made of a heat-resistant material. Heat resistant stainless steel is desirable as the heat-resistant material; an austenite-based material is suitable, for example. Austenite-based stainless steel materials have compositions containing C, Si, Mn, P, S, Ni, Cr, and Mo. The proportion (mass percentage) of the chemical components contained is, for example, equal to or less than 0.08 percent of C, equal to or less than 1.50 percent of Si, equal to or less than 2.00 percent of Mn, equal to or less than 0.045 percent of P, equal to or less than 0.030 percent of S, 19.00 to 22.00 percent of Ni, and 24.00 to 26.00 percent of Cr. Specifically, high-chrome, high-nickel based SUS310S can be employed.

Form processing of the support member can be conducted with a machining center or an NC milling disk. An oxide film is desirably formed to enhance durability on the surface of the support member. The surface treatment used to form the film may be electropolishing, electrostatic coating, or the like.

Next, the forming material employed in the present invention will be described.

In the present invention, the forming material comprised of a thermosoftening substance is employed. Of these, crown-based, flint-based, barium-based, phosphate-based, fluorine-containing, and fluorophosphate-based glasses are suitable. In a first example, suitable glass is glass comprising $SiO_2$, $B_2O_3$, and $Al_2O_3$ as the structural components and having the glass material composition of, given as molar percentages, 45 to 85 percent $SiO_2$, 4 to 32 percent $Al_2O_3$, 8 to 30 percent $Na_2O+Li_2O$ (with $Li_2O$ constituting equal to or less than 70 percent of $Na_2O+Li_2O$), the total quantity of ZnO and/or $F_2$ being 2 to 13 percent (where $F_2 < 8$ percent), $Li_2O+Na_2O/Al_2O_3$ being 2/3 to 4/1, and $SiO_2+Al_2O_3+Na_2O+Li_2O+ZnO+F_2 > 90$ percent.

In a second example, suitable glass are glass having the glass material composition of, given as molar percentages, 50 to 76 percent $SiO_2$, 4.8 to 14.9 percent $Al_2O_3$, 13.8 to 27.3 percent $Na_2O+Li_2O$ (where $Li_2O$ is less than or equal to 70 percent of $Na_2O+Li_2O$), the total quantity of ZnO and/or $F_2$ being 3 to 11 percent (where $F_2 < 8$ percent), $Li_2O+Na_2O/Al_2O_3$ being 2/3 to 4/1, and $SiO_2+Al_2O_3+Li_2O+Na_2O+Li_2O+ZnO+F_2 > 90$ percent.

In a third example, the glass composition is: $SiO_2$ (47.8 percent), $Al_2O_3$ (14.0 percent), $Na_2O$ (12.1 percent), $B_2O_3$ (percent), ZnO (6.0 percent), $F_2$ (2 percent), MgO (2 percent), $Li_2O$ (16.1 percent), $As_2O_3$ (0.3 percent).

In a fourth example, a further suitable glass composition is: $SiO_2$ (63.6 percent), $Al_2O_3$ (12.8 percent), $Na_2O$ (10.5 percent), $B_2O_3$ (1.5 percent), ZnO (6.3 percent), $Li_2O$ (4.8 percent), $As_2O_3$ (0.3 percent), $Sb_2O_3$ (0.2 percent). Other metal oxides, such as MgO, PbO, CdO, $B_2O_3$, $TiO_2$, and $ZrO_2$; coloring metal oxides; and the like may be added to stabilize the glass, facilitate melting, and impart color, so long as they do not exceed 10 percent.

As for further characteristics of the glass material, examples are a distortion point of 460° C., an annealing point of 490° C., a softening point of 650° C., a glass transition temperature (Tg) of 485° C., a yield point (Ts) of 535° C., a specific gravity of 2.47 (g/cm$^3$), a refractive index, Nd, of 1.52300, a thermal diffusion rate of 0.3576 cm$^2$*min, a Poisson ratio of 0.214, a photoelasticity constant of 2.82×10E-12, a Young's modulus of 8,340 kgf/mm$^2$, and a coefficient of linear expansion of 8.5×10E-6/° C.

However, the present invention can be applied to those other than glass and is not limited to the above embodiment.

The above forming material can be obtained by processing the thermosoftening substance into a desired shape. The forming material can be processed by known methods. The shape of the forming material may be a plate shape, spherical, elliptical, a rotationally symmetric shape (toric lenses, aspherical rotationally symmetric dioptric power lenses), a free-form surface shape (progressive dioptric power lenses, aspherical dual-surface dioptric power lenses), or the like. A meniscus shape having two polished spherical surfaces is preferred. In particular, in order to separate the center portion of the lower surface of the forming material from the forming surface at the start of forming and eliminate the contact with the support member by contraction of the upper surface of the forming material with heat-softening, a meniscus-shaped forming material having a lower surface in the form of convex surface and an upper surface in the form of concave surface is preferably positioned on a forming surface of the mold having a concave shape, and a meniscus-shaped forming material having a lower surface in the form of concave surface and an upper surface in the form of convex surface is preferably positioned on a forming surface of the mold having a convex shape.

In the present invention, space is preferably provided between the lower surface of the forming material and the forming surface at the start of forming so as to separate the forming material from the support member by contraction of the upper surface of the forming material by heat softening. Radius of curvature and the like if the lower surface of the forming material and the forming surface of the mold are preferably set taking the above matter into account. The distance (interval) between the center of the lower surface of the forming material and the center of the forming surface of the mold varies with the size of the forming material and the like, and can be, for example, 0.2 to 5 mm. The lower surface of the forming material is preferably has a surface shape approximate to that of the forming surface of the mold to the extent that the above separate state can be maintained. However, when the forming surface of the mold is made into a free-form surface and the lower surface of the forming material is made into a spherical shape to manufacture a casting mold for progressive dioptric power lens, the surface shape of the lower surface of the forming material does not completely meet with that of the forming surface of the mold. For example, it is preferable that the forming surface of the mold is made into a desired free-form shape and the lower surface of the forming material is made so as to have a radius of curvature so that, in a state positioned on the mold, the rim portion of the lower surface of the forming material contacts with the forming material and a space is formed between the forming material and the lower surface of the forming material other than the rim portion. Furthermore, as for the radius of curvature of the lower surface of the forming material, a value at which the interval between the center of the lower surface of the forming material and the center of the forming surface is minimum among the radiuses of curvature at which contact with the forming surface is only at the rim portion and a certain interval is formed with the forming material at portions other than the rim portion.

Furthermore, in the present invention, in FIG. 1, when an arbitrary point on the outermost circumference on the portion in which the lower surface of the forming material contacts with the forming surface of the mold is denoted as E, one point facing E is denoted as E', the vertical distance between the line connecting E and E' (the dotted line in FIG. 1) and the center of the forming surface is denoted as dh (mm), the distance between E-E' is denoted as D (mm), the distance between the center of the lower surface of the forming material and the center of the forming surface is denoted as H (mm), the curvature of the lower surface of the forming material is denoted as r, and the curvature of the forming surface (average curvature in case of the free-form surface) is denoted as R, the forming material and the mold are preferably designed so as to satisfy the following equation.

$$dh = R - \sqrt{R^2 - \left(\frac{D}{2}\right)^2}$$

$$r = (dh - H)^2 + \frac{(D/2)^2}{2(dh - H)}$$

[Numeral 1]

The surfaces of the forming material are desirably mirror surfaces. The roughness of the surfaces is desirably a roughness maximum height Rmax of less than or equal to 0.04 micrometer and an arithmetic average roughness Ra of less than or equal to 0.005 micrometer. The lower limit of roughness for the forming material is, for example, a maximum roughness Rmax of 0.07 micrometer and an arithmetic average roughness Ra of 0.006 micrometer.

In the present invention, as set forth above, following positioning the forming material on the forming surface of the mold with the support with the support member, the forming material is heated on the mold to a temperature permitting deformation.

The "temperature permitting deformation" is desirably a temperature that is greater than or equal to the glass transition temperature (Tg) when the forming material is comprised of glass. Heating may be conducted by a known method, such as by positioning the mold in an electric furnace. By controlling the atmospheric temperature in the electric furnace to a temperature set for the forming material, the forming material can be heated to a desired temperature. The details of temperature control will be described further below. By heat softening in this manner, the entire surface of the lower surface of the forming material is brought into tight contact with the forming surface. Thus, the forming surface shape can be transferred to the upper surface of the forming material to form the upper surface of the forming material into a desired shape. In particular, in the present invention, a mold having a forming surface with a free-form shape is preferably employed. Accordingly, high-precision spherical forming materials having spherical polished surfaces and molds with a free-form shape can be combined to readily form the optical surface of free-form surface on the upper surface of the forming material.

Known molds that are generally employed in the hot sag forming method can be employed as the above mold. However, since metals have poor durability at 800° C., which is generally the maximum temperature of softening processing, and have high coefficients of thermal expansion, the shape is greatly deformed by thermal expansion occurring with temperature changes in the vicinity of 800° C. When the level of change is great, there is a risk that at least either the forming material or mold will not be able to withstand the difference in contraction during cooling at the contact surface between the forming material and the mold, and will be damaged. Accordingly, the mold employed in the present invention is desirably made of a heat-resistant material having good durability and a coefficient of expansion that is close to that of the glass material. Examples of such heat-resistant materials are alumina-based ($Al_2O_3$), AlTiC-based ($Al_2O_3$—TiC), zirconia-based ($ZrO_2$), silicon nitride-based ($Si_3N_4$), aluminum nitride-based (AlN), and silicon carbide-based (SiC) ceramics, as well as other ceramics having primary components in the form of $SiO_2$, $Al_2O_3$, or MgO. Here, the term "having primary components in the form of" means that these components account for equal to or greater than 50 mass percent of the structural components of the mold. Suitable material for the mold material is a ceramic comprising equal to or greater than 99 percent of $SiO_2$, $Al_2O_3$ and MgO and the others such ac $K_2O$.

First, a mold material that has, for example, a hardness (Vickers hardness) of 7 to 24, a curvature strength of 400 to 2,000 MPa, a Young's modulus of 180 to 410 GPa, a thermal conductivity of 3.0 to 170 W/mk, a coefficient of linear expansion of 4.30 to 10.8×10E-6, a heat resistance temperature of 750 to 850° C., and a density of 3.10 to 10.70 g/cm$^3$ is suitable. Second, a material having a hardness (Vickers hardness) of 7 to 15, a Young's modulus of 190 to 210 GPa, a coefficient of linear expansion of 6.0 to 7.0×10E-6, and a heat resistance temperature of 775 to 825° C. is particularly suitable. Third, a material having a hardness (Vickers hardness) of 9 to 15, a Young's modulus of 180 to 402 GPa, a coefficient of linear expansion of 4.30 to 10.8×10E-6, and a heat resistance temperature of equal to or higher than 800° C. is particularly suitable. The mold material is also desirably hydrophobic.

The present invention further relates to a support member for use in a forming method forming an upper surface of a forming material comprised of a thermosoftening substance that has been positioned on a forming surface of a mold into a desired shape by heating the forming material to a temperature permitting deformation to bring a lower surface of the forming material into tight contact with the forming surface, the support member being used for supporting the forming material positioned on the forming surface. The support member of the present invention has an annular part, and, on an inner circumference of the annular part, a support area contacting with at least a portion of the upper edge portion of the lateral surface of the forming material positioned on the forming surface prior to the heating and a nonsupport area being in noncontact state with the forming material. The details of the support member of the present invention are as set forth above.

The present invention further relates to a forming apparatus for use in a method of manufacturing a formed article comprising forming an upper surface of a forming material comprised of a thermosoftening substance into a desired shape by positioning the forming material on a forming surface of a mold and heating the forming material to a temperature permitting deformation to bring an entire surface of a lower surface of the forming material into tight contact with the forming surface. The forming apparatus of the present invention comprises a mold having a forming surface and the support member of the present invention. The forming surface comprises a rim tight contact part and a center separate part, prior to the heating, the rim tight contact part being in tight contact with at least a portion of a rim portion of the lower surface of the forming material and the center separate part separating from a center portion of the lower surface of the forming material. The details of the forming apparatus of the present invention are as set forth above.

A specific embodiment of the method of manufacturing a formed article of the present invention will be described below. However, the present invention is not limited to the embodiment described below.

First, preferably in a clean room, a mold is positioned with the forming surface on top. Subsequently, the support member is fitted into the rim portion of the forming surface and the step mount portion of the lateral surface. The forming material is then placed in a prescribed position on the forming surface along the support member. The edge surface of the lateral portion of the forming material is securely supported horizontally by the support member. The edge surface of the rim portion of the lower surface of the forming material contacts the forming surface of the mold in a vertical direction, and is securely supported. The center portion on the side of the contact surface of the forming material with the mold is separated from the forming surface of the mold.

Next, the dust protective lid is desirably fitted into the support member and placed. After sealing the forming material with the dust protective lid, they are sent from the clean room to an electric furnace. The assembly of the mold, support member, forming material, and dust protective lid is placed in the electric furnace and heat treated with the electric furnace.

In the electric furnace, a heat-softening treatment can be conducted while effecting temperature controls based on a preset temperature program. Either a batch-type electric furnace or a continuous feed-type electric furnace may be employed as the electric furnace. The description of a batch-type electric furnace will be given first.

A batch-type electric furnace is a device in which a piece to be processed is placed in a relatively small, confined space and the temperature within the furnace is varied according to a predetermined temperature program. It is equipped with plural sensors. The temperature is measured by the plural sensors, and each heater can be controlled to manage the temperature. In a batch-type heat-softening furnace, there is a support part holding the piece to be processed. Furthermore, the support part can move within the furnace. Imbalances in temperature distribution due to location within the furnace can be equalized by operating the support part.

A continuous feed-type electric furnace will be described next.

A continuous feed-type electric furnace is a device having an entrance and an exit, in which pieces to be processed are heat treated by being passed through the interior of an electric furnace of set temperature distribution over a certain period by a conveying device such as a conveyor. In a continuous feed-type electric furnace, plural heaters designed to generate and release heat and an internal air circulation control structure can maintain a uniform heat distribution within the furnace.

PID controls can be employed in temperature control by each sensor and heater of the electric furnace. PID controls are a control method for detecting deviation between a programmed target temperature and the actual temperature and restoring (feedback) the deviation from the target temperature to 0. PID controls are a method of obtaining an output in "Proportional", "Integral", "Differential" manner when cal culating from the deviation. The general equation of PID controls is given below.

General equation of PID controls: [Numeral 2]

$$y = K_P\left(e + K_I \int e\,dt + K_D \frac{d}{dt}e\right)$$

P term:

$$K_p \cdot e_n$$

I term:

$$\int e\,dt = \lim_{\Delta i \to 0}\left(\sum_{i=0}^{n} e_i \Delta t\right) = \Delta t \Sigma e_n$$

D term:

$$\frac{d}{dt}e = \lim_{\Delta t \to 0}\left(\frac{\Delta e}{\Delta t}\right)$$

as $$\Delta e = e_n - e_{n-1},$$

$$\frac{1}{\Delta t}(e_n - e_{n-1})$$

Thus:

$$y = Kp\left[e_n + K_I \Delta t \Sigma e_n + \frac{K_D}{\Delta t}(e_n - e_{n-1})\right]$$

In the above equations, e denotes deviation, K denotes gain (the gain with the subscript P denotes proportional gain, the gain with the subscript I denotes integral gain, and the gain with the subscript D denotes differential gain), Δ(DELTA)t denotes the sample time (sampling time, control frequency), and subscript n denotes the current time.

Using PID controls makes it possible to increase the precision with which the temperature is controlled within the furnace for changes in the heat quantity distribution based on the shape and quantity of inputted pieces to be processed. A nonsliding system (for example, a walking beam) can be adopted for conveyance within the electric furnace.

In the specific embodiment of a continuous feed-type electric furnace that can be used in the present invention, the conveyance system is a nonsliding system, the temperature controls are PID temperature controls, the temperature measurement device is "K thermocouple 30 point made by Platina", a maximum use temperature is 800° C., the commonly employed temperature ranges from 590 to 650° C., the internal atmosphere is a dry air (free of oil and dust), the atmospheric control is in the form of an inlet air curtain, internal furnace purging, and an outlet air curtain, and the temperature control precision is ±3° C., and the cooling system is air cooling.

The temperature within the electric furnace can be increased from room temperature to higher than the glass transition point, but lower than the glass softening point, by heating and rising temperature when employing a glass material as the forming material. The temperature is desirably maintained lower than the glass softening point for a certain period, and then gradually reduced to room temperature.

The temperature is controlled within the electric furnace in a cycle of prescribed duration.

An example of temperature control in which an individual cycle lasts 17 hours and a glass substance is employed as the forming material will be described below. However, the present invention is not limited to the embodiment described below.

Furnace temperature control can be conducted in seven steps. The first step (A) is a preheating step. The second step (B) is a rapid heating and temperature-rising step. The third step (C) is a slow heating and temperature-rising step. The fourth step (D) is a step in which a constant temperature is maintained. The fifth step (E) is a slow cooling step. The sixth step (F) is a rapid cooling step. And the seventh step (G) is a natural cooling step.

In the preheating step (A), which is the first step, a constant temperature close to room temperature is maintained for 90 minutes. This is done in order to establish a uniform temperature distribution throughout the glass material and to facilitate reproducibility of the thermal distribution of the glass material by temperature control during processing by heat-softening. The temperature that is maintained can be any temperature of about room temperature (about 20 to 30° C.).

In rapid heating step (B), which is the second step, heating is conducted for about 90 minutes by increasing the temperature from room temperature (for example, 25° C.) to a temperature 50° C. below (also called "T1" hereinafter) the glass transition temperature (also referred to as "Tg" hereinafter) at a rate of about 4° C./min, for example. Then, in slow heating step (C), which is the third step, heating is conducted for 120 minutes by increasing the temperature from temperature T1 to a temperature about 50° C. below the glass softening point (also called "T2" hereinafter) at a rate of 2° C./min, for example. In constant temperature maintenance step (D), which is the fourth step, temperature T2 is maintained for about 60 minutes.

The glass material that has been heated to temperature T2 is heated for about 30 minutes in the constant temperature maintaining step. Heating is then conducted for another 30 minutes at temperature T2. Thus, the forming material can be softened and deformed, and the entire surface of the lower surface of the forming material can be brought into tight contact with the forming surface to form the upper surface of the forming material into a desired shape.

Next, once deformation by heat-softening has been concluded, cooling is conducted. In slow cooling step (E), the fifth step, cooling is conducted, for example, for about 300 minutes at a rate of 1° C./min to a temperature 100° C. below Tg (also called "T3" hereinafter) to fix the change in shape caused by deformation. The slow cooling step also comprises annealing elements to remove glass distortion.

Next, in rapid cooling step (F), the sixth step, cooling is conducted to about 200° C. at a rate of about 1.5° C./min. There is a risk of the glass that has been processed by softening and the mold being damaged by their own thermal contraction and differences between each other in coefficients of thermal expansion to temperature change. Accordingly, the temperature change rate is preferably small to the extent that damage does not occur.

Further, when the temperature drops to equal to or lower than 200° C., rapid cooling step (G), the seventh step, is conducted. In rapid cooling step (G), natural cooling is conducted from 200° C. to room temperature.

Once softening processing has been completed, the lower surface of the glass material and the forming surface of the mold fit precisely together. The upper surface of the glass material deforms based on the shape deformation of the lower surface of the glass material, forming the desired optical surface. Once the glass optical surface has been formed in the above steps, the glass material is removed from the mold, yielding a formed article. The formed article thus obtained can be employed as a casting mold for eyeglass lenses. In particular, since the method of the present invention can transfer the surface shape of the forming surface of the mold precisely to the upper surface of the forming material, it is suitable as a method for obtaining a casting mold for eyeglass lenses with a complex surface shape. An example of such casting mold for eyeglass lenses is a progressive dioptric power lens.

INDUSTRIAL APPLICABILITY

The present invention is suitable for use in forming a casting mold for eyeglass lens, especially for multifocal eyeglass lens.

Figure 1:
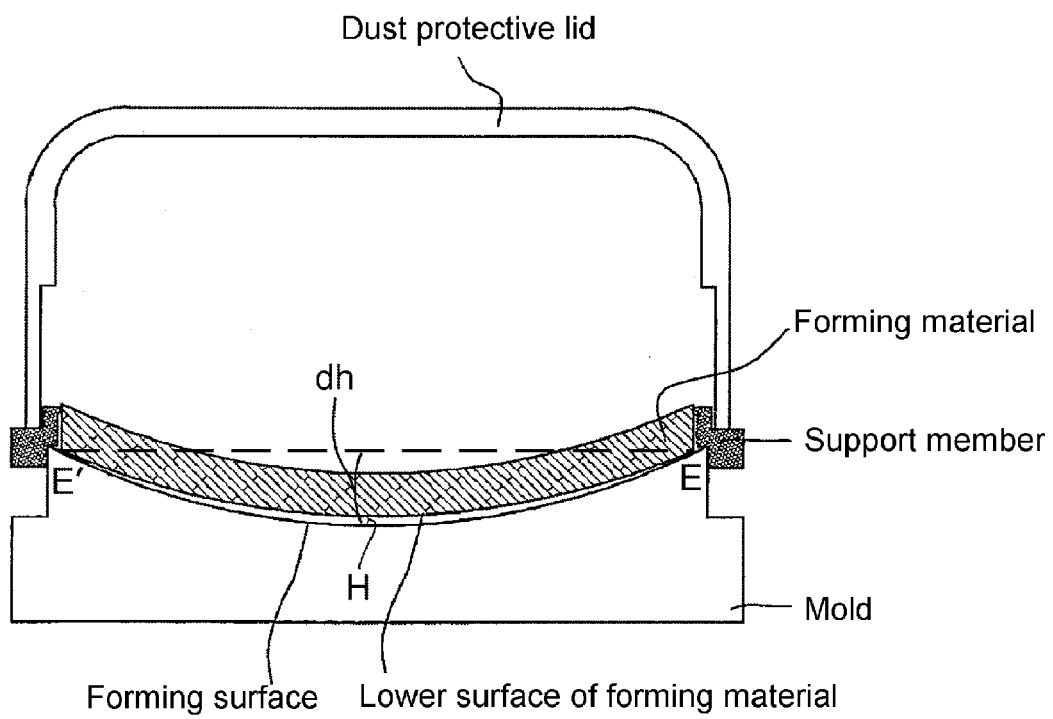
FIG. 1 It shows a schematic diagram of the state of contact between the mold and the forming material before and after softening.
Figure 1:
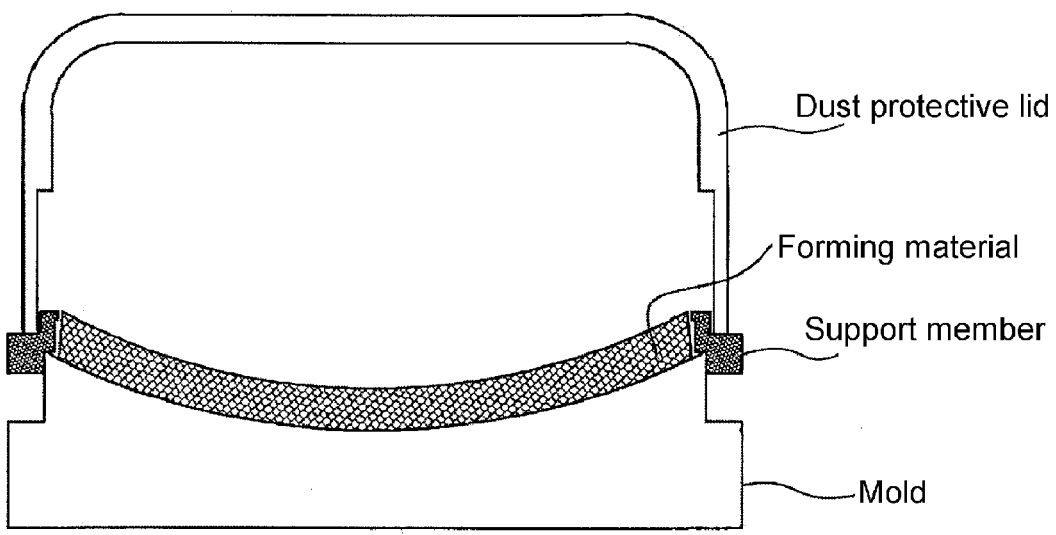
Figure 2:
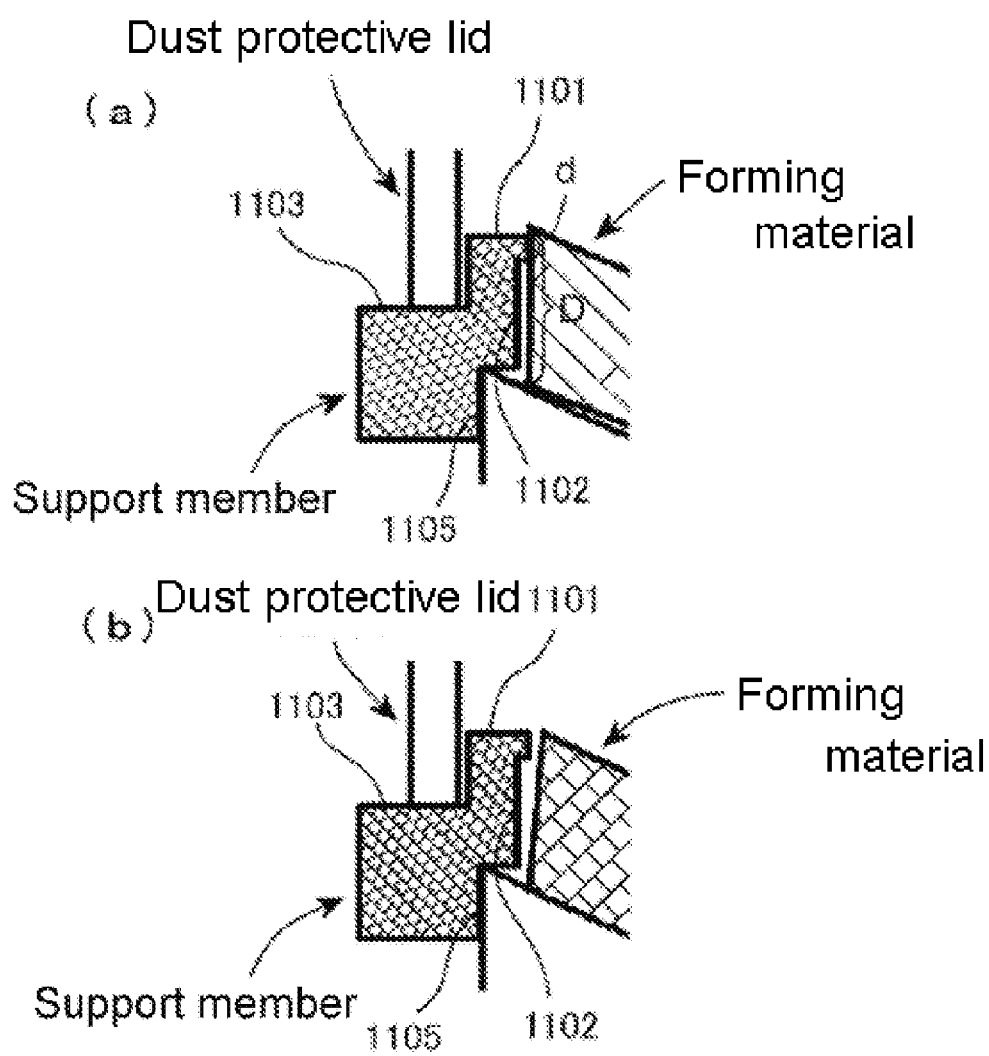
FIG. 2 It shows an enlarged schematic diagram of the state of contact between the support member and the lateral surface of the forming material before and after softening.
Figure 3:
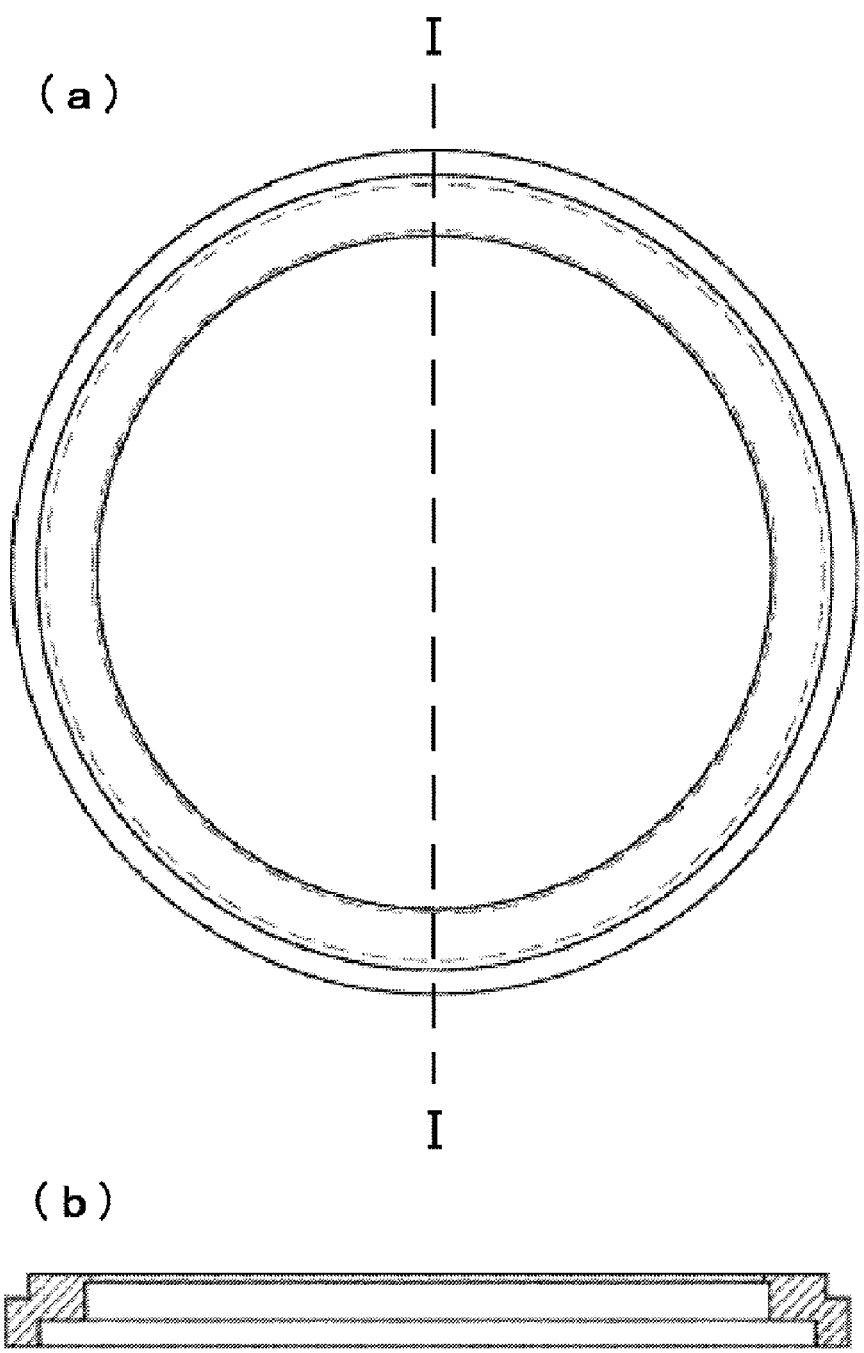
FIG. 3 A top view of the annular member shown in FIG. 1 is shown in FIG. 3(a), and a sectional view along section line I-I in FIG. 3(a) is shown FIG. 3(b).

The invention claimed is:

1. A method of manufacturing a formed article comprising forming an upper surface of a forming material comprised of a thermosoftening substance into a desired shape by positioning the forming material on a forming surface of a mold and heating the forming material to a temperature permitting deformation to bring an entire surface of a lower surface of the forming material into tight contact with the forming surface, wherein
    the positioning of the forming material is conducted by supporting the forming material with a support member so that at least a portion of a lower surface rim portion of the forming material is in tight contact with the forming surface and a center portion of the lower surface of the forming material is separated from the forming surface, and
    the support with the support member is conducted so that the support member contacts with an entire circumference of the upper edge portion of the lateral surface of the forming material during the support in a state where a lower portion of a lateral surface of the forming material is separated from the support member.

2. The method of manufacturing a formed article according to claim 1, wherein the upper edge portion of the lateral surface of the forming material is separated from the support member at least on and after the time when the lower surface of the forming material is in tight contact.

3. The method of manufacturing a formed article according to claim 2, wherein the upper edge portion of the lateral surface of the forming material is separated from the support member by contraction of the upper surface of the forming material by the heating.

4. The method of manufacturing a formed article according to claim 2, wherein the support member is maintained in a secure state at least until the upper edge portion of the lateral surface of the forming material separates from the support member.

5. A method of manufacturing a formed article comprising forming an upper surface of a forming material comprised of a thermosoftening substance into a desired shape by positioning the forming material on a forming surface of a mold and heating the forming material to a temperature permitting deformation to bring an entire surface of a lower surface of the forming material into tight contact with the forming surface, wherein
    the positioning of the forming material is conducted by supporting the forming material with a support member so that at least a portion of a lower surface rim portion of the forming material is in tight contact with the forming surface and a center portion of the lower surface of the forming material is separated from the forming surface,
    the support with the support member is conducted so that at least a portion of an upper edge portion of the lateral surface of the forming material is supported by the support member in a state where a lower portion of a lateral surface of the forming material is separated from the support member, and
    wherein the support member is an annular member on which inner circumference a protruding part is provided, and the protruding part contacts with the upper edge portion of the lateral surface of the forming material to support the forming material.

6. The method of manufacturing a formed article according to claim 5, wherein the upper edge portion of the lateral surface of the forming material is separated from the support member at least on and after the time when the lower surface of the forming material is in tight contact.

7. The method of manufacturing a formed article according to claim 6, wherein the upper edge portion of the lateral surface of the forming material is separated from the support member by contraction of the upper surface of the forming material by the heating.

8. The method of manufacturing a formed article according to claim 6, wherein the support member is maintained in a secure state at least until the upper edge portion of the lateral surface of the forming material separates from the support member.

9. The method of manufacturing a formed article according to claim 5, wherein the support member contacts with at least three points on the upper edge portion of the lateral surface of the forming material during the support.

* * * * *